United States Patent
Schneider et al.

(10) Patent No.: US 6,819,746 B1
(45) Date of Patent: *Nov. 16, 2004

(54) EXPERT SYSTEM FOR LOOP QUALIFICATION OF XDSL SERVICES

(75) Inventors: Allan Schneider, Falls Church, VA (US); Aaron Dagen, Brooklyn, NY (US); Zinovy Grinbaum, Livingston, NJ (US)

(73) Assignee: Verizon Services Corp., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/613,512
(22) Filed: Jul. 10, 2000
(51) Int. Cl.[7] .............................................. H04M 3/22
(52) U.S. Cl. ............... 379/29.01; 379/1.04; 379/27.01; 379/29.09
(58) Field of Search .......................... 379/22.04, 29.01, 379/27.01, 1.04, 27.03, 29.09, 9, 28, 1.01, 1.03, 15.03; 370/249

(56) References Cited

U.S. PATENT DOCUMENTS

| | | | | |
|---|---|---|---|---|
| 6,091,713 A | * | 7/2000 | Lechleider et al. | |
| 6,209,108 B1 | * | 3/2001 | Pett et al. | |
| 6,215,855 B1 | * | 4/2001 | Schneider | |
| 6,266,395 B1 | * | 7/2001 | Liu et al. | 379/27.01 |
| 6,292,539 B1 | * | 9/2001 | Eichen et al. | |
| 6,463,126 B1 | * | 10/2002 | Manica et al. | 379/27.01 |

* cited by examiner

Primary Examiner—Curtis Kuntz
Assistant Examiner—Barry W Taylor
(74) Attorney, Agent, or Firm—Leonard C. Suchyta, Esq.; Joel Wall, Esq.; Rader Fishman & Grauer PLLC

(57) ABSTRACT

A technique for qualification of loops for new digital subscriber line services (DSL) involves use of an expert system, such as a neural network. A database of loop characteristic information and performance data enables the expert system to train or learn how to predict performance for future loops. In response to data characterizing a new loop to be qualified, the trained expert system predicts digital subscriber line performance for the new loop. Typically, the prediction enables classification of service capacity for the new loop into one of several classes corresponding to levels of DSL service offered through the network. The database for use by the expert system is updated as each newly qualified loop is brought into service and actual performance for that loop is known.

31 Claims, 4 Drawing Sheets

EXPERT SYSTEM FOR LOOP QUALIFICATION OF XDSL SERVICES

FIELD OF THE INVENTION

The concepts involved in the present invention relate to automated techniques for qualifying subscriber loops for digital subscriber line (DSL) services, based on the learning capabilities of an expert system. Preferably, the inventive techniques classify loops by prediction of performance metrics indicating that loop performance falls within ranges of data rate corresponding to different xDSL service grades offered by a carrier or other service provider.

BACKGROUND

Modern society continues to create exponentially increasing demands for digital information, and the communication of such information creates increasing needs for ever-faster data communication speeds. To meet the demand for speed, a number of technologies are being developed and are in early stages of deployment, for providing substantially higher rates of data communication, for example ranging from 640 kb/s to several Mb/s. In particular, a number of the local telephone carriers are working on enhancements to their existing copper-wire loop networks, based on various xDSL technologies. xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line). As one example, ADSL modems today are typically providing downstream data rates in ranges of 640 kb/s, 1.6 Mb/s and 7.1 Mb/s.

Installation, operating and maintenance of xDSL data services, however, pose a number of problems. These problems may be particularly acute where a carrier is considering upgrading to an xDSL service on an existing subscriber's line circuit. The precise data rate of any xDSL service depends on many factors, such as line length, copper wire gauge, cross-coupled interference, and the like. As a general rule, the shorter the distance and/or the larger the diameter of the wire (smaller the gauge), the higher the rate can be on the particular telephone line. If the wiring has been in place and used for Plain Old Telephone Service (POTS) there may be load coils on the line, which prevent xDSL services. Bridged-taps, which are common in telephone loop plant, also cause severe performance problems.

To provide service to a customer seeking to upgrade to an xDSL service, the carrier must determine if the loop to that customer's premises can support the desired xDSL grade of service, and if not, what lower rate service the loop might support. Loop Qualification refers to the task of pre-determining the data rate capacities of loops for high-speed services. For example, a current ADSL Loop Qualification process may focus on which one of three service ranges a customer's loop can support. The three service grades refer to ranges of data described by upper limits of 640 kb/s, 1.6 Mb/s or 7.1 Mbps. Customers are charged based on which range data rate range they choose, predicated on the loop's ability to support it. The fourth possibility, however, is that the loop cannot support any DSL service.

Loop qualification often relies on parameters culled from existing databases regarding cable make-ups of a carrier's outside loop plant. Cable make-up refers to information such as wire gauges, loop lengths and load coils. Sources of cable make-up information include legacy databases and test systems. These sources, however, are notorious for containing incomplete and erroneous information. Further, the quality of databases vary from region to region, telephone company to telephone company and even from wire-center to wire-center. The problems with such information is further increased by the spate of mergers involving regional telephone companies, particularly when each party to the merger has its own legacy and test systems with varying degrees of accuracy and completeness.

The Loop Qualification process to this point has focused primarily on human expert experience in quantifying loop capacity, using established criteria for determining data rates. Some Loop Qualification processes, for example, rely primarily on manually weeding out obvious high power interference sources located in the same binder group, such as T1 disturbers. In most other cases, loop qualification is based solely on the distance of the customer from the CO. The.process is intensely manual and often requires many truck rolls to confirm or repair service. Due to the inaccuracies or incompleteness of the data used or the limitations of the human expert, the current qualification processes produce two basic types of errors.

Type A errors occur when the carrier qualifies a loop, certifying that it can support a desired grade of service, but when actually used by the subscriber, the loop does not support that grade of service. This generates a complaint by the customer, and the carrier often will send personnel to try to test the line and fix the problem. Sometimes, repairs are possible but require considerable labor. At other times, the repairs may not even be feasible. The subscriber, of course, will not pay for the service that the carrier fails to deliver. The attempts to make manual repairs incur considerable expense, in terms of truck rolls, even if the repairs ultimately fail to deliver the service that the carrier stated that the line could deliver.

The other type of errors, Type B, occur when the carrier decides that a line will not support a desired grade of service, when in fact it could. In this case, the subscriber may obtain a lower grade service over the line, but of course, the subscriber will pay a lower rate than would otherwise have been the case. In many instances, the qualification process may indicate that the line will not support any kind of DSL service at all, in which case the carrier completely loses the opportunity to sell a subscription for such a service to the would-be customer. All such errors essentially cost the carrier opportunities to sell a service or to sell an even higher grade of service and result in lost revenue.

Hence, both errors result in quantifiable economic costs that are borne by the exchange carrier. Failure to mitigate these errors results in reduced revenues and increased expenses. More specifically, Type A errors result in increased expenses due to the dispatch of unnecessary truck rolls. Type B errors translate into lost revenue. Both error types lead to a reduced profitability of xDSL services. Additional expenses also accrue, directly and indirectly, from the increased 'bad will' of customers towards the carrier, an increase in unsatisfied customers, greater scrutiny by regulatory agencies, and an eroded corporate image. Other service offerings may also suffer reduced profitability since customer dissatisfaction with xDSL could lead to disconnects by dissatisfied customers who then seek broadband and other services from competitors, and so lead to a hemorrhaging of current revenue and profit streams or the DSL carrier.

Predictive models have been developed in a first effort to automate the task of predicting the level of service that a loop might support. Any such model is only a first order approximation of reality and is only as good as the assumptions incorporated into the model. For example, several existing models predict service level or throughput for xDSL service as a function of loop length. For lines under otherwise equal conditions, these models adequately approximate the values of performance metrics as a function of the variable loop length. However, such models can not account for other variable conditions, particularly locally unique conditions, that may effect xDSL performance. For example, two lines of the same overall length may support radically different levels of xDSL service. One may support a high-rate service, and the other may not support any DSL service, because of differences in the bridged tap conditions of the two lines. If the model does not include bridged tap as a parameter, the model will not accurately predict this difference.

Also, with deterministic models it is not really possible to account for variables that in many cases may not be specifically known, such as different levels of exposure to localized sources of external interference. Deterministic models simply can not deal with effects of parameters that are not specifically included in the deterministic algorithms.

Finally, the deterministic models can not deal with inaccurate or incomplete data. Because the cable make-up information from a carrier's existing legacy systems often is incomplete or inaccurate, there is no way to insure that the deterministic model can provide a prediction or that the prediction will ever be relatively accurate.

Hence, while the deterministic models do allow automation, they have helped little to reduce the instances of Type A and Type B errors.

It is an objective of this invention to automate the loop qualification process. A further objective is to automate the loop qualification process in such a manner as to reduce or eliminate errors, for example, the errors caused by inaccurate or incomplete data in a carrier's loop-plant data records or produced by existing test systems. Any such system or methodology should be capable of providing accurate qualification with relatively little data and/or in spite of errors in existing data. Also, the loop qualification technique should be adaptive, as the system receives new information regarding actual lines in service and/or relating to changes in outside-plant conditions.

SUMMARY OF THE INVENTION

The invention achieves the above stated objects and overcomes the noted problems in the art through the use of an expert system, typically based on neural networks.

An 'expert system' for purposes of discussion here is a computer program, which compiles a set of general rules or algorithmic statements from analysis of a database of known inputs and outputs. The expert system runs a logical engine to apply a given set of facts, about a new input, to the statements learned from the database to predict one or more new outputs. An expert system is able to account for unknown or hidden type input parameters, that is to say data that affects results that are not explicitly recognized. Also, an expert system adjusts the algorithm(s) based on experience to improve its performance. The expert system requires neither a physical or prescribed relationship between the inputs and outputs. The expert system approximates relationships in algorithms, but a person need not recognize or ever understand any of those relationships.

In accord with the invention, a database is built of information characterizing loops providing xDSL service and information regarding the performance of those loops. The database includes data for loops carrying the various levels of DSL service available in the network and preferably some data regarding loops that the carrier has found can not support any of the available levels of DSL service. The expert system 'learns' from this operational database to develop and maintain a set of internal statements for predicting performance. Essentially, the expert system correlates the in-service loop characteristic data to the performance data for the in-service loop to develop the predictive statements. Then, in response to data characterizing a new loop for which an xDSL grade of service is requested, the expert system predicts a level of performance using its most current set of internal statements.

If the new loop qualifies for an xDSL grade of service, the carrier can place that loop in service. Subsequently, the carrier obtains performance data for the actual service on that loop and adds the characteristic data and performance data for that loop to the operational database of the loop qualification system.

Aspects of the invention relate to systems and methods for qualifying a loop with regard to digital subscriber line service, using the inventive expert system approach. Other aspects of the invention relate to software products, operation of which in a computer enables the computer to qualify a loop with regard to digital subscriber line service.

For example, one aspect of the invention relates to a system for qualifying a loop with regard to digital subscriber line service in a network providing a plurality of levels of digital subscriber line service over a plurality of loops. The system includes a database of records regarding loops in service in a predefined section of the network. Each record for an in-service loop includes characteristic data regarding the loop and performance data regarding capability of operation of a digital subscriber line service over that loop. The loop qualifying system also comprises an expert system coupled to the database. The expert system learns statements by correlating the predetermined characteristic data to the known performance data. A source provides an input to the expert system of at least some characteristic data regarding a loop to be qualified. In response, the expert system applies the learned statements to the input characteristic data, to develop a performance prediction for the loop being qualified.

The preferred embodiments of the invention incorporate the information about the cable make-up of each loop that is available from several legacy databases and test heads. In the preferred embodiment, the expert system uses a neural network program, for example implementing a genetic algorithm. The use of such expert systems increases the number of parameters that can be used in determining loop qualification, improving accuracy and system robustness. Also, such an approach takes advantage of the ongoing ability of expert systems to 'learn' based on new data input, and the ability of such systems to accept noisy data. Furthermore, expert systems can accept data of varying degrees of completeness and yet remain relatively fault tolerant, recovering from the transfer of inaccurate elements of data, a prevalent feature in telephone company legacy and test systems. Consequently, the system will reduce the occurrence of Type A and Type B errors.

Though the following description concentrates on the use of this system in determining grades of service, it is equally applicable for determining other metrics related to the performance or the quality of service (Qos) of a carrier's network.

The preferred embodiment of a system implementing the invention includes a database containing the cable make-ups of xDSL lines in operation and the highest grade of service for which each in-service line qualified. For example, the database may, depending on availability and accuracy at each location, consist of operational parameters such as loop gauge, length, and location, length and gauge of bridged taps, binder group identification, and services offered in the same or adjacent binder groups. As each new loop is evaluated for qualification, the available cable-make up for that loop will be loaded into the system. As noted before, data will be obtained from the appropriate sources including legacy databases and test-heads. Practically, the different degrees of accuracy and the different types of systems available throughout a telephone company will probably dictate that data for different loops will be obtained from different sources.

The initial data set, constantly expanding as more lines are introduced, is accessible to the expert system from the database. The expert system will use this initial data set to 'learn' about the network setup. As new cable make-ups are entered, for qualification purposes, the expert system will examine the inputs and adjust its internal weights—either directly or through hidden layers—and produce the 'best' output prediction for grade of service for each subsequent line. For example, for a network application supporting three grades of xDSL service, the expert system would classify new loops for the three levels or for no DSL service possible. The expert system can be expanded to output 'N' possibilities. The 'best' output prediction is based on standard statistical practices, such as the least root mean square error or highest correlation.

As monitoring systems examining actual performance are introduced into the network and/or customer complaints are received, the database is adjusted to reflect increased knowledge of the cable make-up and grade of service actually achieved. Each new xDSL correction provides the expert system neural network an opportunity to 're-learn' the carrier's loop plant. 'Re-Learning', or more practically the adjustments of weights within the neural network, compensates for instances in which a loop is qualified at a particular speed and is found to operate at a higher speed (Type B error) or lower speed (Type A error). As a neural network can use an initial functional form, in the hidden layers of the expert system, to optimize its performance, appropriate predictive, deterministic models will be selected to provide an initial performance prediction. The model will be selected based on the available information in the cable make-up and will be adjusted as additional information is provided.

This system is equally useful in the implementation or planning environments. Depending on need and other constraints, the system can be implemented on a wire-center basis—that is the expert system is located or virtually connected to the CO—or in a more centralized location. In the centralized scenario, the central computer will download the necessary performance and cable make up data from several COs and the appropriate test and monitoring systems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PRESENTLY PREFERRED EMBODIMENTS

Figure 1:
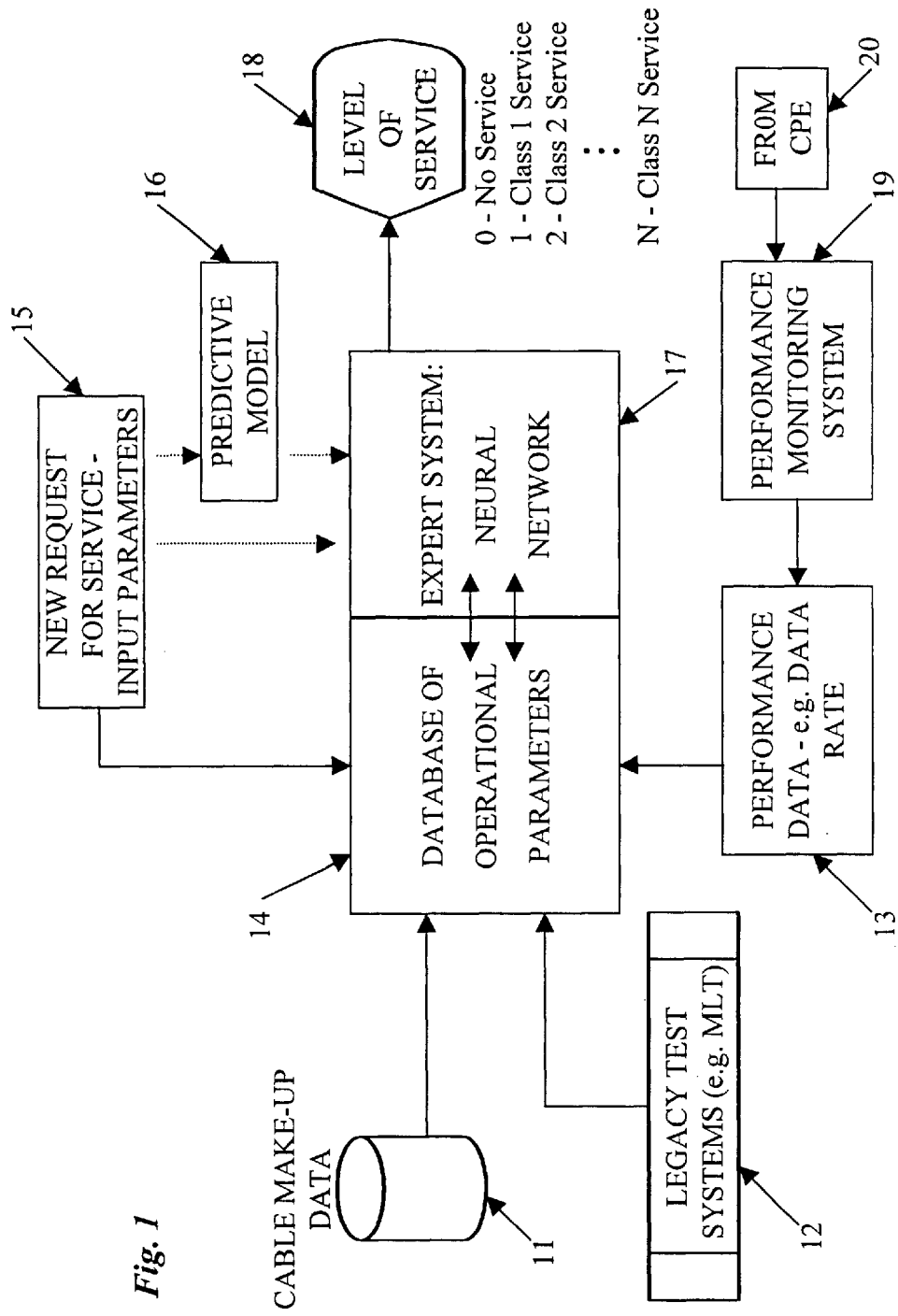
FIG. 1 is a block diagram of the system data flow and processing of a loop qualification process using an expert system, useful in explaining the concepts of the present invention.

The present invention involves software, systems and methodologies for qualifying a loop with regard to digital subscriber line services. A database of loop characteristic information and performance data enables an expert system to train or learn how to predict performance. In response to data characterizing a new loop to be qualified, the trained expert system predicts digital subscriber line performance for the new loop. Typically, the prediction enables classification of service capacity into one of several classes corresponding to grades of digital subscriber line service offered through the network.

The loops terminating at a central office facility and the environmental noise imposed on those loops tend to be relatively unique. At the central office level or even lower, it is possible to gather data characterizing the performance of the loops. An expert system, for example using neural network type processing, can process that data together with cable make-up data and known performance data to "learn" how the loops behave under localized conditions. From that knowledge base, the expert system then develops predictions as to new lines that might be qualified for an xDSL service or the like under relatively similar conditions. As each new line is brought into service, the information about that loop and the performance data relating to actual xDSL operation on that loop are added to the knowledge base of the expert system, for its subsequent use in predicting performance on the next loop in question.

The preferred embodiments use neural network software. A neural network is a self-adaptive algorithm to analyze data on known items to predict how the next unknown item will perform. The algorithm can be updated each time a new item, in this case a new xDSL line, is brought into service. The neural network processing readily adapts to individual processing environments. A single neural network approach can easily handle the varying conditions found at hundreds or even thousands of central offices that a carrier might operate, eliminating the need to develop special loop qualification software models for each office. The basic neural network is the same, and typically, the format of the database is the same. However, the actual data in the database varies due to local conditions, therefore the expert system qualifies loops from each office in a manner that accurately reflects the learned localized conditions regarding each office.

As shown by this discussion, the system uses several types of data. One type of data is the performance data, for the xDSL lines that are already in service. Typically, this data will relate to throughput or some other metric of service level or quality of service. The system also uses data about the characteristics of the lines, lengths, gauges, binder groups, bridged taps, etc. The line characteristic data for lines that are in-service together with the performance data for those lines makes-up the ensemble of training data in the operational database. For a new loop identified in a new request for xDSL service, similar line characteristic data, to the extent available, is used as input to the expert system to predict a performance for that new line.

All of the data used by the system needs to be kept current. Performance data needs to be updated, to account for changes in operation, for example due to changes in ambient conditions that effect performance, for example, variations in loop insertion loss attributable to seasonal/external changes in loop temperature. The characteristic data for both the in-service lines and the lines for customers that may request xDSL service also needs updating, for example, to reflect changes in the bridged taps on each line as the carrier shifts service for different customers served through a particular bundle or binder group.

FIG. 1 illustrates both the high-level system components and the process flow of a loop qualification system incorporating an expert system, in accord with the present invention. Loop qualification utilizes a database 14 of operational parameters. The data regarding each operational loop includes the two major components, characteristic data and performance data. The database 14 stores characteristic cable make-up data at least for those lines or loops providing xDSL service or previously identified as incapable of supporting such services and may store similar data for other loops not yet carrying xDSL service. The performance data, for example, might indicate the actual speed of service on each line and/or no service on some lines.

As shown, loop plant data regarding the cable make-up for existing lines resides in a database 11 or other existing "legacy" sources. Essentially, this information relates to the knowledge of the operating carrier about the structure of the outside loop plant. As discussed more later, the data in source database 11 includes at least certain parameters useful in predicting xDSL performance. In practice, these systems often contain a wealth of other information, but most of that other data is not particularly useful in the loop qualification process. This data at least includes data for those loops that currently carry xDSL services. Preferably, this database or another database also contains characteristic data of a similar nature for loops that the carrier expects to upgrade to a DSL service in the near future.

The legacy data systems 11 provide data about the cable make-up of various lines throughout the carrier's area of operations. These systems include databases of information regarding existing conditions, such as binder group, number of lines in a bundle, assignment of specific lines to individual customers, locations of terminals, bridged taps, etc. One example of such a legacy data system is the Loop Facility Assignment and Control System (LFACS), which is a computerized system that some local exchange carriers use to maintain a mechanized inventory of outside plant facilities, (e.g., facility addresses, cables, cable pairs, serving terminals, cross connection devices, loops, etc.).

Depending on data availability and accuracy, the invention utilizes characteristic information about operating xDSL lines consisting of loop length, loop gauge, bridged tap length, location and gauge or other relevant information such as other services offered in the same binder group (e.g., T1, HDSL, etc). All of the data may come from the carrier's existing database(s) 11, but preferably some components of this cable make-up information may be obtained or verified from legacy test systems 12, such as the Mechanized Loop Test (MLT) system. MLT, for example, provides test information about the entire loop length and bridged taps. The test system(s) 12 can provide the relevant data for lines providing xDSL services and for lines not yet providing such a service, for example, for a line about to be qualified for xDSL service.

From these systems 11 and 12, it is possible to obtain a comprehensive description of the cable make-up. The characteristic descriptive data and the legacy test system data are compiled into the database 14.

The database 14 also receives DSL loop performance data at 13. In operation, the customer premises equipment (CPE) 20 communicates over the loop with elements of the network, typically an xDSL modem card in a DSLAM or "Digital Subscriber Line Access Multiplexer." The more modern network elements include a system 19 to monitor performance on such communications 20. A DSLAM or its modem cards, for example, may include a system to calculate the loop throughput based on the modem communications between the DSLAM and the CPE. The monitoring equipment 19 may provide data regarding other performance metrics, such as bit-error rate. The system 19 provides the performance data, preferably including at least the actual data rate communicated to and from the CPE modem over the xDSL loop. The monitoring function 19 supplies this performance data 13 to the operational database 14.

The combination of the characteristic descriptive data from 11 and the legacy test system data (if any) from 12 together with the performance data from 13, for the loops providing actual xDSL service from the particular office or DSLAM and any loops from the office found not to support xDSL service, forms an ensemble of operational data for training an expert system 17, such as a neural network.

The expert system 17 is essentially a software product running on a computer system for predicting a result based on data regarding a new input of interest and a database of known characteristic and performance information regarding a number of similar items already in operation. Stated another way, the 'expert system' is a computer program, which compiles a set of general rules or algorithmic statements from a database of known inputs and outputs. The database 14, for example, provides the information to train the expert system 17. An expert system runs a logical engine to apply a given set of facts, about a new input, to the statements learned from the database to predict one or more new outputs. An expert system is able to account for unknown or hidden type input parameters, that is to say data that affects results that are not explicitly recognized, and it adjusts the algorithm(s) based on experience to improve its performance. The expert system requires neither a physical or prescribed relationship between the inputs and outputs, but it may improve speed and accuracy. The expert system approximates relationships in algorithms, but a person need not recognize or ever understand any of those relationships. In the preferred embodiment of the invention, the neural network 17 uses the cable make-up data from 11, 12 together with performance data from 13 for in-service lines operating through the particular office or DSLAM to "learn" how to predict how new lines served through the office or DSLAM will perform.

During training, the expert system essentially correlates all of the predetermined characteristic data to all of the performance data for the known items, in this case the in-service loops. Based on this correlation, the expert system 17 develops a series of equations and statements and determines coefficients for those statements expressing relationships of the predetermined characteristic data to the performance data. In this way, the expert system learns from the known data to predict the supportable levels of digital subscriber line service. This information can then be shared with marketing and/or provisioning departments, to ensure successful service performance.

When a new loop is qualified, the expert system 17 predicts the performance of that loop for an xDSL service. Then, when the carrier places that loop in-service, the DSLAM provides actual performance data for that loop, and that data is added to the performance data in database 14 that the expert system 17 uses to predict performance for the next new loop. Unlike deterministic systems, the expert system 17 actually accounts for unknown parameters by adjusting its hidden layer(s) to effectively match input data to output data for all known cases. As the database grows and/or is updated, the expert system adjusts its internal algorithms to maintain the correlation of the actual outputs to the inputs.

There are a variety of expert systems. The preferred embodiment uses a neural network type expert system 17. The presently preferred implementation of the expert system 17 uses a Ward Systems neural network program that implements a genetic algorithm.

Figure 2:
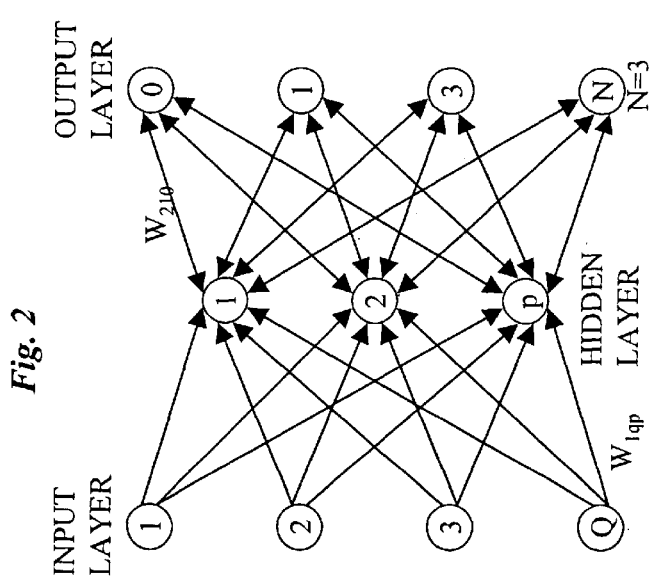
FIG. 2 is a flow-diagram illustrating the 'learning process' of an expert system neural network.

A neural network, such as shown in FIG. 2, typically consists of several layers. The first layer is the input layer. This layer receives all of the input information, such as the cable make-up data relating to the line under consideration. The output layer characterizes the results in terms of the desired prediction parameter, in the preferred embodiment, the desired level of service. The hidden layer, shown in the middle, represents the statements or equations developed during training, which the logical engine of the expert system 17 applies to the new input data regarding the loop to be qualified.

The hidden layer consists of a number of logical 'neurons' where the calculations are performed. The number and type of calculation performed at each neuron may vary widely and will change over time as the neural network obtains more information and/or more accurate data to work with. The neural network software effectively adjusts the coefficients as it learns, that is to say as the neural network receives more data.

Hence, instead of specifying assumptions or predetermined equations to characterize the relationship of the output parameter (bit rate) to the input (cable make-up data), the neural network is trained using cable make-up data and actual DSL performance results for lines already in-service. Alternatively, initial training may use data generated by a predictive model, such as the model 16.

FIG. 2 illustrates an input layer that may consist of: loop length and gauge, bridged tap length, gauge and location, and services offered in the same or adjacent binder groups. This is the same information as input via the components 11 and 12 in FIG. 1. The outputs refer to the three (or n) levels of service—plus the case of total service rejection represented by case 0.

In this example, one hidden layer is shown. In actuality, depending on the available information and the model or models used, there may be none to several hidden layers deployed. The hidden layer shown has, symbolically, up to p outputs. This value may change for other hidden layers. One data transfer with a weight is illustrated for each of the layers, though in actuality each line represents a data transfer adjusted by a weight. The arrows indicate the directions of the transfer of data and weights. The input layer to the first layer is a one way communication—the inputs are empirical values and cannot be adjusted. Communications between the first hidden layer and subsequent hidden layers and/or the output layer may be bi-directional, depending on the 'learning' protocol used.

The system is 'trained' by providing inputs and actual, verified results in the output layer. The initial data used for training consists of the service information available on previously installed xDSL lines and will be updated as shown in FIG. 1, using components 11, 12 and 13. When a new line is ready for qualification, its cable make-up is transferred through the input layer to hidden layer(s) or models as in FIG. 2. The appropriate model, or layer, is selected based on the available information. From the hidden layer, bi-directional communication occurs between the output layer and the hidden layer. Weights are adjusted per the protocol chosen to most accurately produce the correct output. The criterion and protocol will be chosen based on appropriate statistical methodologies. Examples of standard criterion of selection of output used for adjusting weights include finding the highest correlation with the data set, or finding the highest R squared, or choosing least mean squares. A standard protocol of weight adjustment is the use of gradient descent. Other protocols and criteria may also be used, as appropriate.

Known neural networks may use a number of different types of computational methods for adjusting the coefficients or weights, for example least squares, gradient, or genetic algorithms. Different vendors of neural network software incorporate different proprietary designs of these algorithms. Any such computational method may be used. The choice affects the speed and accuracy of the neural network. The presently preferred neural network software implements a genetic algorithm.

Returning to the actual qualification technique represented by FIG. 1, assume now that a subscriber requests one of several available DSL services. A new line here may be a line just recently installed by the carrier. However, many times such a new line is an existing loop over which the subscriber receives telephone service, and the subscriber now desires to upgrade to an xDSL service.

As the new subscriber's line enters the qualification process, characteristic data for that line will be input through component 15. Input operation component 15, for example input of the telephone number or other line identification, triggers the two data collection steps involving characteristic data input from the components 11, 12 and may provide information front any other reliable source, with regard to the new line. As described previously, cable information may vary from line to line depending on availability and accuracy of the legacy systems and test heads. As a result of this input operation 15, the operational database 14 and/or the expert system 17 now has characteristic data for the new loop, to the extent available, that is similar in type to that used to train the expert system 17 with regard to the in-service lines.

Preferably, the input data regarding the new line is stored in the database 14. After storage in the database, the cable make-up parameters are input into the expert system 17. Communication between the expert system and the database is bi-directional. In the case of qualifying a new line, the information from previous lines will be input into the expert system 17, from the database 14 for updated training. The expert system 17 will then use all available previous information to 'learn' about the process, adjust the weights in its system and provide the loop qualification result 18.

The loop qualification could output a predicted data rate in bits per second, but preferably the system will classify the data rate into one of several ranges corresponding to the best available level or grade of service that the line might support. In this manner, the system outputs to marketing and/or provisioning personnel a number or other identifier representing the predicted level of service. For an exchange carrier network offering n levels of DSL service, there are n+1 possibilities for levels of qualification: service could be rejected (level of service 0); or one of n levels of service, corresponding to data rates, can be provided on that line.

The initially preferred network implementation will offer customers three types or levels of xDSL service, 640 kb/s, 1.6 Mb/s and 7.1 Mb/s. These rates refer to the maximum bit rate over the line, in the downstream direction toward the customer premises. The exchange carrier or a competitor charges a higher fee for each higher rate of service. The preferred embodiment of the loop qualification technique therefore qualifies loops to provide the three different levels of service or indicates that loops will not support any of the available xDSL services.

For proof-of-concept, a simulated data set was contrived for two hundred representative circuits and combined with a representative variety of cable make-up data. The loop lengths were random between 5 and 15 kfeet, some with bridged taps with random tap length up to 10% of the total loop length. The predictive model 16 generated simulated performance data for the loops. The particular model 16 is based on loop length gauge and bridged tap information, as well as interference sources and is one that has been validated using actual in-field performance results. The results for a certain number of the simulated lines, were used to train the expert system 17, and the rest of the simulated data was used to test the performance of the expert system. In an actual implementation, the very first training may use predicted data or use actual performance results for the first two hundred lines in-service.

For the simulation, the inventors created a neural network based on the data for the first ten lines, and then input the data for the other one hundred ninety simulated lines and predicted the data rates that the lines would support. The average error of the simulation was approximately 3.3 kb/s, which is sufficiently small and clearly shows that the system could easily classify each line to the four possible service ranges (0, 640 kb/s, 1.6 Mb/s, 7 Mb/s). As the number of samples of known data increases, the neural network learns more real results, and the accuracy of the prediction improves. In the simulation, the average error became relatively stable at about the 3.3 kb/s level once the data for at least 30 to 50 loops was available in the training ensemble for the expert system.

The maximum error found during the simulation was approximately 110 kb/s. However, this error occurred with only ten lines in the training set. As the number of lines in the training set increased, the maximum error detected fell below 20 kb/s for a training set of 40 or 50 lines.

In an actual exchange carrier's network, an end office may have an average of 40,000 lines. A significant percentage of those lines will become xDSL lines. For each central office, the training set for the expert system will include data for those lines already providing xDSL service, typically thousands of lines.

From the simulation, it was found that the gauge of wire and gauge of bridged tap did not greatly contribute to the determination of bit-rate of the circuits. The most important contributors in order of importance were bridged tap length (unused downstream wire connected to the tap), the pre-tap length (CO to tap) of the circuit and the post-tap length (tap to CPE). The overall length data (pre-tap, post-tap and bridge tap lengths) may come from MLT. The location of the tap, and thus the breakdown may come from stored data records or from another test system.

The expert system 17 predicts the performance of items conforming to the particular data set that the system uses as its learning data. For example, if all data comes from the predictive model 16, the expert system 17 becomes a good predictor of the output of the predictive model. In the case of actual loop qualification, using real performance data for loops in-service, the expert system 17 becomes a good predictor of new lines coming into service under similar conditions. In this case, the simulated conditions are those for lines in-service from a particular end office, or if any office has multiple DSLAMs, for lines served from a particular DSLAM.

The more the expert system receives complete relevant data affecting performance, the better it will predict. However, the data need not necessarily indicate the exact nature of the relevance. The expert system, through its learning function, assigns its own level of significance to each data point. For example, it may be that lines running through aerial cable bundles pick-up more interference from AM radio stations than do lines running in underground cable bundles. The available data regarding cable make-up may not specify underground or aerial cable runs, however, the data would include bundle or binder identifications. The expert system would learn over time that the loops run in a certain bundle perform better than those in another bundle do, where the identified bundles with better performance actually are those that just happen to be underground. In this way, the expert system 17 actually learns how to allow for hidden conditions not expressly specified in the data or in its internal algorithms.

Figure 3:
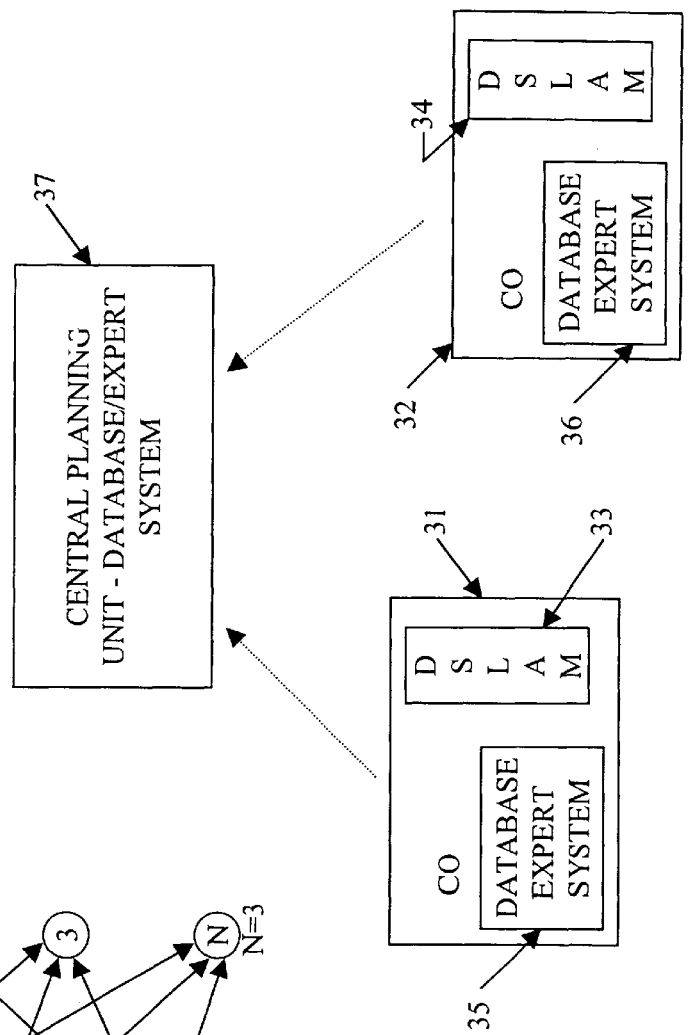
FIG. 3 is a block diagram showing residence of the software implementing the invention in central office locations and/or a centralized location.

The data used to train and operate the expert system preferably is segregated by central office. The performance of the loops tends to differ between local network segments. As shown in FIG. 3, the database and expert system 35, 36 may be implemented at the central office 31, 32 or even at the level of the DSLAMs 33, 34. For example, each DSLAM may incorporate an embedded database and expert system. In any such implementation, each computer running the database and expert system would receive cable make-up data from the various systems operated by the carrier, but the data would include only that relevant to the individual office. The database and expert system 35 or 36 would receive performance data for in-service loops from the respective DSLAM 33 or 34 in the particular office 31 or 32.

There may ultimately be a loop qualification program installed for each central office and/or for each DSLAM in each office. The basic form of the qualification database and the expert system, however, are the same. Each such system learns using the real-world data regarding cable make-up, test data and performance data relating to the actual loops served through the individual office or DSLAM.

FIG. 3 also shows that the system can be centralized or located in a wire-center, as deemed necessary by the business units of the exchange carrier. Location in a wire-center may require the system actually be in the central office or may entail a 'virtual' connection. The dashed lines indicate the option of information obtained through components 11, 12, and 13 in FIG. 1 being downloaded to a centralized database and expert system 37 remote from the central offices (COs). Each CO could have its own Expert System depending on the needs of the business or rely on the centralized database 37.

The carrier may operate the centralized system 37, for example, in association with a business office or customer service bureau for processing new requests for xDSL services. The centralized system could communicate with the specific database and expert system 35 or 36 in each central office, to input request data and obtain predictive results. Alternatively, the database(s) and expert system(s) could run on the centralized computer system 37. Data would be uploaded, as necessary, from the central office equipment to the central computer system 37, for example to input the actual performance data regarding the loops in-service from a particular office. However, even in the central computer system, the training of the expert system using the database preferably is unique to the particular office.

Hence, the qualification process actually may occur almost anywhere. The processing may be performed in the DSLAM or at the central office location, or the processing power may reside in a central location. The invention also encompasses computer systems implemented outside the central offices but in a distributed processing type fashion. In each case, however, the qualification procedure preferably uses data as to line make-up and performance of in-service DSL circuits that is keyed to the specific office or DSLAM. It will be recognized that for qualification in networks defining local physical segments to a different level or different degree of granularity, the qualification processing may use data keyed to the appropriate network segment or level.

Figure 4:
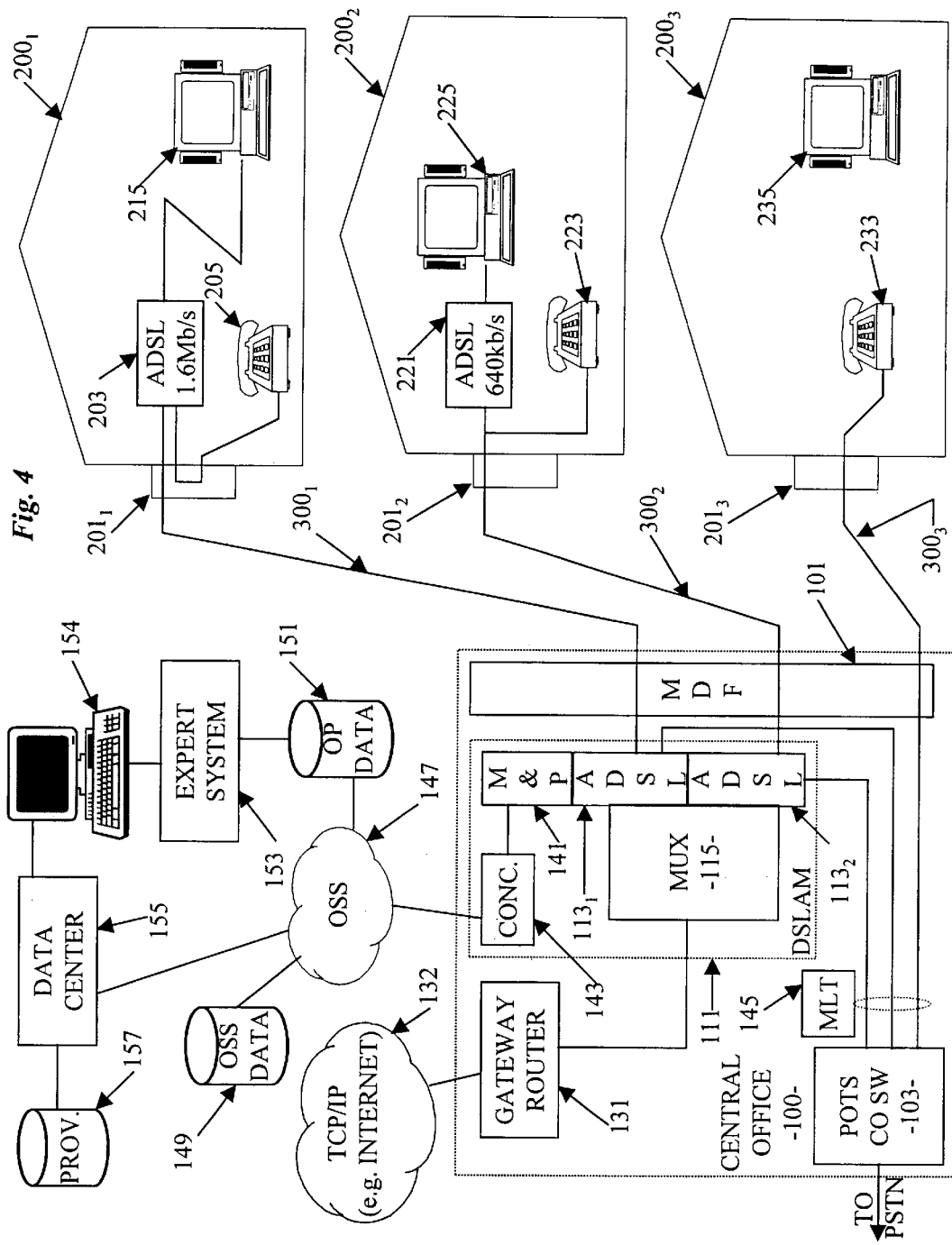
FIG. 4 is a block diagram of an exemplary network providing ADSL services and implementing loop qualification for such services in accord with the present invention.

Persons skilled in the telecommunications art also will recognize that the present invention is applicable to line testing for a number of different types of lines and for a number of different digital services that such lines may transport. Thus, the inventive loop qualification techniques readily apply to a wide range of networks. However, to fully appreciate the advantages of the invention, it may be helpful to consider application of the invention to a specific network providing two or three levels of DSL service, as a detailed example. FIG. 4 illustrates an example of local exchange carrier type of telephone and data network, which may utilize the line qualification in accord with the present invention.

The end-user for data services may be a single PC user or a small business or a residential LAN user. The customer access comprises an xDSL twisted pair. In the presently preferred embodiment, the network supports the noted three levels of DSL service. The ADSL-based local access network provides access to the Internet, to corporate local area networks (LANs), and the like. The high speeds available through the local network enable a wide range of communications, for example, of text data, of video data, for multimedia, for web browsing, transfers of files, database searching, and the like.

As shown in FIG. 4, a central office (CO) 100 provides Plain Old Telephone Service (POTS) and Digital Subscriber Line (DSL) data service for a number of customers. For purposes of discussion, assume that the equipment at the various customer premises 200 connect directly to the CO 100 via twisted pair 300. In an actual implementation, many customers may connect through such wiring to an intermediate terminal linked to the CO via optical fiber. Also, for simplicity assume that the exchange carrier operating the CO 100 provides the DSL services. Those skilled in the art will recognize that the DSL services may be offered and relevant equipment installed in the CO building by other service providers and/or resellers in competition with the local exchange carrier.

For purposes of discussion, the drawing shows three customer premises 200. Each customer subscribes to plain old telephone service (POTS) from the local exchange carrier. At customer premises $200_1$ the customer also subscribes to an ADSL service at the 1.6 Mb/s rate, whereas the customer at premises $200_2$ subscribes to a lower rate ADSL service offered at the 640 kb/s rate. The network may support a variety of other xDSL services. Assume, however, that the customer at the lower premises $200_3$ is seeking to add an ADSL service, and the carrier needs to qualify a line to those premises for the desired quality and grade of service.

In the CO 100, each customer's line connects to appropriate network equipment through a main distribution frame (MDF) 101. For telephone service, the CO 100 includes a normal POTS switch 103. Since the third customer currently subscribes only to POTS telephone service, that customer's line $300_3$ connects through the MDF 101 to a line card (not separately shown) within the normal POTS switch 103. The switch 103 routes voice-grade telephone calls for each subscriber loop through the public switched telephone network in the normal manner.

The lines 300 for the other customers connect through the MDF 101 to a Digital Subscriber Line Access Multiplexer (DSLAM) 111. The DSLAM includes a bank of ADSL terminal units 113 and a multiplexer/demultiplexer (MUX) 115. More specifically, within the DSLAM 111, each DSL customer line 300 connects to an assigned ADSL terminal unit 113 in the central office (ATU-C). In the example illustrated, the first customer's line $300_1$ connects through the MDF 101 to a first ADSL terminal unit $113_1$ in the CO 100. The second customer's line $300_2$ connects through the MDF 101 to a second ADSL terminal unit $113_2$ in the CO 100. The ADSL units 113 include appropriate frequency dependent combiner/splitters, for segregating out the voice telephone traffic. Thus each ADSL unit 113 provides a connection for telephone traffic from the associated line 300 to the POTS switch 103. Further, each ADSL terminal unit 113 supports at least the one ADSL service, to which the customer subscribes.

The ADSL units 113 essentially act as modulator/demodulators (modems) for sending and receiving data over the subscriber telephone lines 300. On the network side, each of the ADSL units 113 connects to the MUX 115. The MUX 115 multiplexes and demultiplexes the upstream and downstream data for the ADSL modems 113 and provides a high-speed link a gateway router 131.

The router 131 acts as the gateway to a wide-area network illustrated as a data network 132, for example providing packet switched TCP/IP communications to the Internet or to private intra-nets. The TCP/IP communication may ride on an SMDS network. The SMDS (Switched Multi-Megabit Data Service) network provides fast, packet-switched access to equipment of Internet service providers and to private intra-networks operated by corporations and the like. It should be understood that SMDS is simply an example, and that the backbone network 132 may utilize frame relay or asynchronous transfer mode (ATM) to provide access to other TCP/IP networks.

For the data customer, the network provides a full-time dedicated connection intended to be active or "on" at all times. The very first packet sent by a customer premise computer goes to the router 131, which reads the Internet Protocol (IP) address in the packet, determines that it is desired to set up a session, and commences the steps to establish a session to the appropriate destination through the network 132.

Each ATU-C type ADSL card 113 at the central office end of a line also connects through a Maintenance and Provisioning Interface Card (M&P-Card) 141 to a data concentrator 143. The M&P Card 141 collects data from multiple ATU-C type cards 113, and the concentrator 143 transmits that data through a private data network operated by the carrier for its operations and support systems, shown as OSS network 147. Alarms and performance data for both the ATU-R (remote) ADSL modem and the ATU-C modems can be collected and routed from the CO 100 over the OSS packet data network 147, to a variety of different systems. The ATU-C and the ATU-R may be provisioned and monitored over this link. Of note for purposes of this discussion, certain operational status messages, regarding the performance of in service xDSL lines, are transmitted through the OSS network 147 to the database 151 for the operational data. This database 151 essentially corresponds to the database 14 of FIG. 1.

Consider now several examples of customer premises equipment and wiring, for telephone and data services available from the network.

At the customer premises $200_1$, the copper loop $300_1$ carrying both the POTS and ADSL signals connects through a Network Interface Device (NID) $201_1$ placed at the side of the home. A two pair loop is installed from the NID to the location where the ADSL unit 203, typically an ATU-R modem, is located in the home. One pair connects all of the signals on the line $300_1$ from the NID $201_1$ to the ADSL modem 203. Within the ATU-R type modem 203 of the full or "heavy" ADSL service there is a passive splitter/combiner type filter, which segregates the POTS signal and the data signals. The POTS signal is then transmitted over the second twisted pair back to the NID $201_1$. The POTS line is then connected to the in-home wiring extensions at the NID $201_1$, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 also sends data to the ADSL modem 203. The modem 203 modulates the upstream data and transmits appropriate signals over the line $300^1$ to the modem $113_1$ in the CO 100. The ATU-R interface may support bridging, such that multiple users can share the ADSL modem 203, for two-way data communication through the CO 100. For this subscriber, the downstream communication carries data at speeds up to the 1.6 Mb/s rate.

At the customer premises $200_2$, the copper loop $300_2$ carrying the POTS and ADSL signals again connects through a NID $201_2$ placed at the side of the home. For a 'Lite' installation, there may be no need for a splitter and combiner. Both the POTS signal and the ADSL signal are transmitted over the twisted pair in-home wiring to the ADSL-Lite modem 221 and to one or more standard telephone devices 223 in the home. Alternatively, the ADSL modem 221 and the POTS telephone 223 may connect to the line in the same manner as in the customer premises $200_1$.

Within the ADSL modem 221, the downstream coded ADSL signal is demodulated and decoded back to an appropriate data interface protocol and supplied to the PC 227. In the upstream direction, the ADSL modem 221 modulates data for transmission in the appropriate frequency range over the twisted pair line $300_2$ to the ADSL modem $113_2$ in the CO 100. On this loop, however, the data communications, at least in the downstream direction, operate at or about the 640 kb/s rate.

The customer at premises $200_3$ presently has only a telephone service. As such, the line $300_3$ connects through the NID $201_3$ and the customer premises wiring to one or more pieces of standard telephone equipment 233. The customer may have a computer 235, but for this example, assume that the computer is not yet connected to the data network. The customer has asked for an xDSL service, such as ADSL or ADSL-Lite.

In this embodiment, the database and the expert system for loop qualification are implemented on centralized computing systems. In a fashion similar to the database 14 of FIG. 1, the operational database 151 is a compilation of descriptive data and performance data for lines that are in operation or in-service, both for xDSL loops and for some loops found not to support any available xDSL service. For purposes of illustration, there is one database 151 for the local exchange carrier's network, however, in accord with the preferred embodiment, that database system includes a segment or virtual database of information regarding the loops 200 served by the DSLAM 111 and/or the central office 100.

Legacy database systems such as OSS database 149 provide data about the cable make-up of various lines throughout the carrier's area of operations through the OSS network 147 to the operational database 151. Legacy test systems such as the MLT 145 provide measured data for calculation of cable length or the like. From these systems, the database 151 compiles a comprehensive description of the cable make-up that is relevant to the xDSL qualification process, including for example: loop gauge, length of the loop, presence/number of bridged taps on the loop, the gauge/length of any bridged tap, post-tap length, pre-tap length, signal power, environmental noise, and bundle (other elements in the same binder groups with the line) as in the earlier embodiment. In a similar manner, the database 151 compiles characteristic data regarding additional lines served through the office, at least for each new line $300_3$ to be qualified and preferably for lines that the carrier expects may be upgraded to DSL service in the near future.

The database 151 also receives DSL loop performance data for lines currently providing DSL service and for any lines found incompatible with DSL service. In this embodiment, the invention can rely on the monitoring and reporting capabilities of the DSLAM 111 to provide the performance data regarding those loops carrying an xDSL service. Each ATU-C type ADSL card 113 provides reports as to status through the M&P-Card 141 and the data concentrator 143. The M&P Card 141 collects performance data from multiple ATU-C cards 113, and the concentrator 143 transmits that data through the OSS network 147. In the DSLAM 111, the ADSL card monitoring function provides information about noise, line capacity, signal power, attenuation. The monitoring accumulates this information for both the upstream data communications and the downstream data communications over the loop.

For purposes of the invention, at least some of the performance data report messages go through the network 147 to the operational database 151. For example, the ADSL card or ATU-C $113_1$ periodically reports data rates corresponding to operation at or about 1.6 Mb/s. Similarly, the ADSL card or ATU-C $113_2$ periodically reports data rates corresponding to operation at or about 640 kb/s. This operation may also indicate the best rate that each in-service loop could support if higher. The database 151 stores the performance data in the records corresponding to the loops $300_1$ and $300_2$, respectively.

In actual operation, a customer requests an xDSL service, for example, the customer at premises $200_3$. A customer service representative for the carrier operates a terminal 154 to input data regarding the request, for example, in the carrier's business office. The customer center receives the data regarding the new service request, and this request data is input to a data center computer 155 that compiles data regarding various service requests by the carrier's customers. The data identifies the customer and the customer's line $300_3$ as well as the desired grade/quality of xDSL service.

The expert system 153 uses the operational database 151 as its training data. The expert system 153 also receives the request for the new xDSL service from the terminal 154 or the data center computer 155. The request data is used to identify information available at the level of the operational database 151 regarding the customer's line $300_3$, similar in content to the characteristic data used for the training of the expert system. For example, the data for the new requestor's line, such as its length, gauge, bridged taps if any, etc. is retrieved from storage in database 151 and input to the expert system 153. The expert system 153 uses all of this available data about the requestor's loop $300_3$ to predict the level of service that the requesting customer's line should be able to support using the most recent update of its internal statements.

The expert system 153 uses the characteristic data and performance data for the loops served through the DSLAM 111 to determine and update its predictive statements, typically in the hidden layer. Of particular note, in this example, the training data includes the characteristic data for the loops $300_1$ and $300_2$. The training data also shows that the loop $300_1$ supports 1.6 Mb/s service, and the loop $300_2$ supports 640 kb/s service. In the preferred embodiment, the expert system utilizes neural network software to generate a service level as a function of the known data about the line and about other in-service xDSL loops. The neural network looks at previous data for actual operations and adjusts the hidden coefficients of the model.

The neural network software is capable of operating with some data missing, although the accuracy may decrease. The neural network may also be able to compensate for some errors in the data, however, if an entry in the database is simply wrong, for example overstating the loop length by an order of magnitude, the software will not produce an accurate result. However, if the error is relatively consistent, the system will actually adapt through its training routine to account for the consistent error. Over time, the actual prediction of each new line is based on all of the actual performance data for the lines already in service, and as such, it reflects the data known about the cable make-up as well as the actual performance data supplied by the DSLAM 111.

Hence, the expert system 153 accurately predicts the performance of the line or loop of the party newly requesting the xDSL service, in this case, the loop $300_3$. The expert system 151 transmits the prediction results back to the terminal 154 at the customer center indicating the level of service qualification of the particular loop.

The expert system 153 returns a predictive loop qualification, for example as a display on the terminal 154, indicating which if any of the levels of xDSL service the customer's line $300_3$ will support. Alternatively, the display may indicate that the line will not support any of the xDSL services offered by the carrier.

If the loop qualification is 0, the customer representative must inform the party requesting service that the loop will not support any service. Most often, however, the qualification indicates that the loop will support data rates up to one of the levels offered by the carrier. If this includes the requested level of service, the customer data center can instruct provisioning and operations personnel to implement the requested service. If the service level indicated by the qualification is lower than that requested, the carrier can still offer the customer that level of service. If acceptable, the customer data center can instruct provisioning and operations personnel to implement the agreed-upon lower level of service.

Assuming that the prediction indicates that the loop will support an xDSL service and the particular service is either at or above that requested or at least is acceptable to the customer, the carrier initiates procedures to implement the xDSL service on the loop $300_3$. As part of this procedure, the representative at terminal 154 will instruct the data center computer 155 to forward a work order to the carrier's provisioning system 157, to provision network equipment to provide the desired service. A work order also will be sent to the appropriate personnel dispatch systems to dispatch a central office technician to install an ATU-C card in the DSLAM connected to the loop $300_3$. In a typical scenario today, the carrier would also dispatch a technician to the customer premises $200_3$ to install a remote (ATU-R) modem and connect it between the loop $300_3$ and the customer's data device(s) 235.

Once installation and provisioning for the loop $300_3$ is complete, the customer can begin xDSL data communications over that loop. The new ATU-C type ADSL card 113 connected to that loop provides reports as to status to the M&P-Card 141 and the data concentrator 143, the same as the other ATU-C cards. The M&P Card 141 and the concentrator 143 will forward performance data messages regarding operation of the new service, and at least some of those messages go through the OSS network 147 to the operational database 151. In many systems, this data may actually indicate the maximum rate for upstream and the maximum rate for downstream that the line $300_3$ may support as well as the rates at which the modems are currently running. In this manner, the performance data for the loop $300_3$ is added to the training data for the expert system 153, which uses the expanded ensemble to train the system 153 before prediction regarding the next customer to request service that would be provided through the DSLAM 111 in the CO 100.

In the illustrated example, the expert system 153 and the operational database 151 are centralized components available to the terminals 154 operating at the data center 155 where the carrier typically takes orders for new services. In such an implementation, the database 151 would include similar data regarding in-service xDSL lines and potential xDSL service lines for other offices, and the expert system would operate in an essentially similar manner to provide loop qualifications to the terminal 154 upon request for loops served through other offices and DSLAMs.

Although shown as separate systems in the drawings, one computer may actually run the software and provide the storage for the expert system 153 and the operational database 151. A simple example of such a computer appears in FIG. 5. Also, there are a variety of ways to implement these systems on network computers communicating via the OSS network 147. For completeness of discussion, however, it may be helpful to consider one computer implementing the expert system and operational database.

Figure 5:
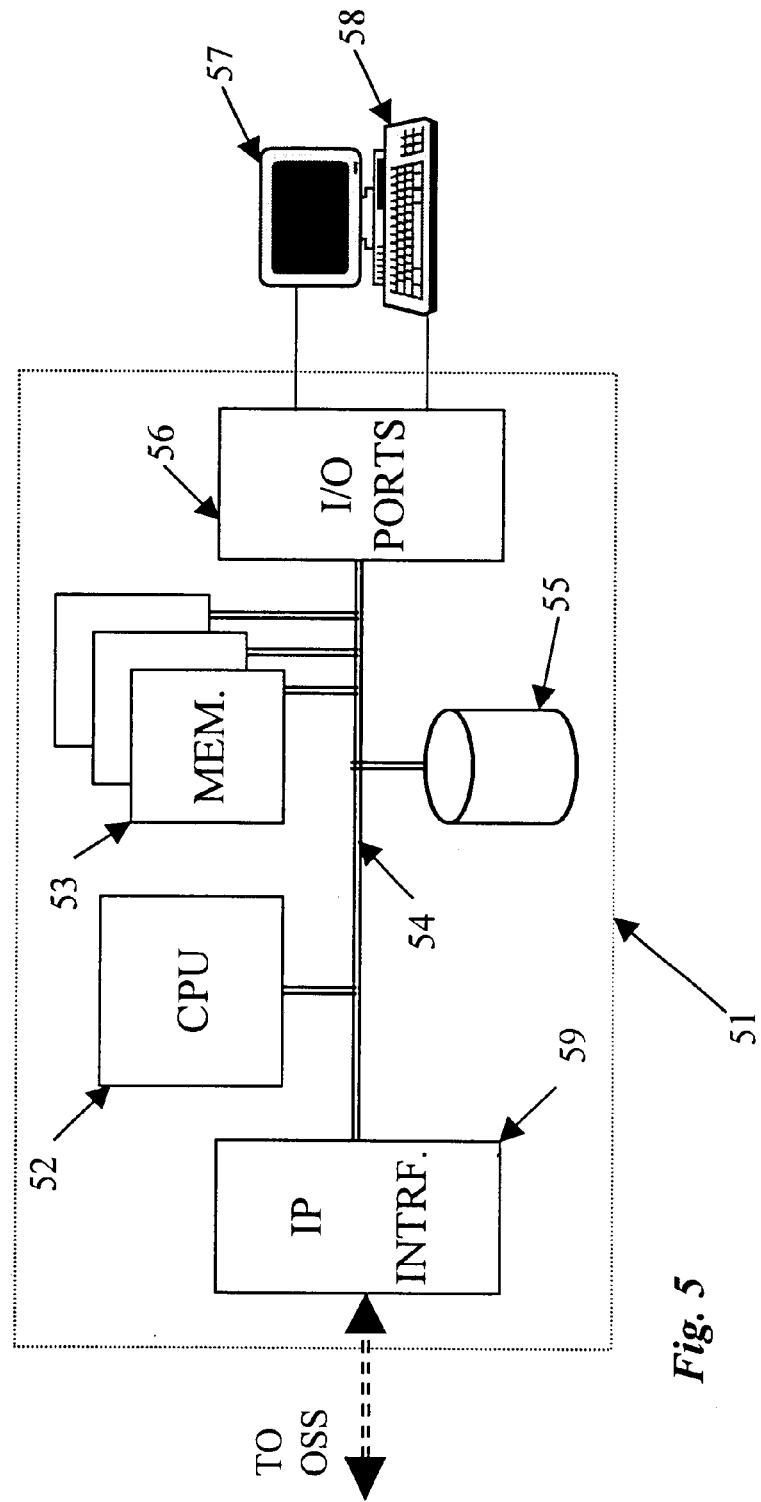
FIG. 5 is a block diagram illustrating the major functional components of a computer for implementing the operational database and the expert system.

FIG. 5 illustrates a high level block diagram of a general purpose computer system 51, which may perform the functions of the expert system and the database of operational data. In this example, the system 51 is essentially a single computer although those skilled in the art will recognize that the system 51 may comprise more complex data systems.

The exemplary computer system 51 contains a central processing unit (CPU) 52, memories 53 and an interconnect bus 54. The CPU 52 may contain a single microprocessor, or may contain a plurality of microprocessors for configuring the computer system 52 as a multi-processor system. The memories 53 include a main memory, a read only memory, and mass storage devices such as various disk drives, tape drives, etc. The main memory typically includes dynamic random access memory (DRAM) and high speed cache memory. In operation, the main memory stores at least portions of instructions and data for execution by the CPU 52.

The mass storage may include one or more magnetic disk drives or optical disk drives, for storing data and instructions for use by CPU 52. At least one mass storage system 55, preferably in the form of a disk drive or tape drive, stores the data tables of the operational database. The mass storage may also include one or more drives for various portable media, such as a floppy disk, a compact disc read only memory (CD-ROM), or an integrated circuit non-volatile memory adapter (i.e. PC-MCIA adapter) to input and output data and code to and from the computer system 51.

The system 51 also includes one or more input/output interfaces for communications, shown by way of example as an IP interface 59 for packet data communications via the OSS network 147. In the illustrated example, the computer system 51 may be a personal computer or a workstation. Such a computer may be located at or even integrated into a DSLAM. Alternatively, the computer may be anywhere that there is a convenient connection to the OSS network 147.

As a PC or workstation type implementation, the system 51 may further include appropriate input/output ports 56 for interconnection with a display 57 and a keyboard 58. For example, the computer may include a graphics subsystem to drive the output display 57. The output display 57 may include a cathode ray tube (CRT) display or liquid crystal display (LCD). Although not shown, the system typically would include a port for connection to a printer. The input control devices for such an implementation of the system 51 would include the keyboard 58 for inputting alphanumeric and other key information. The input control devices for the system may further include a cursor control device (not shown), such as a mouse, a trackball, stylus, or cursor direction keys.

In other applications, however, the computer system 51 may take the form of a standalone server and may not include elements for providing a local user interface. In such a case, a user would input the data regarding the new request for xDSL service and receive the displayed results on a remote terminal that communicates with the server via the OSS network.

The components contained in the computer system 51 are those typically found in general purpose computer systems used as servers, workstations, personal computers, network terminals, and the like. In fact, these components are intended to represent a broad category of such computer components that are well known in the art. The computer system 51 runs a variety of applications programs and stores data, enabling one or more interactions via the user interface, provided through elements such as 57 and 58, and/or over the packet switched OSS network 147.

Some aspects of the invention relate to software products, each comprising a machine or computer readable medium and executable code carried by that medium. The code, executable by the CPU processor of the computer system acting as the expert system, performs the service level prediction for a newly identified loop based on the cable make-up data of that loop and the system's 'knowledge' of make-up and performance of existing loops that do and do not support xDSL service.

When loaded into the computer system, the executable code and any associated data reside in one or more of the memories 53 associated with the CPU 52 of the system 51 and are loaded into working space in the main memory or registers within the CPU, as needed for operation. As such, one type of medium, which will bear the executable code of the products comprises various physical storage media used in the computer system. Examples of this type of media include, RAM, ROM, cache memory, hard and floppy disk drives, JAZZ drives, ZIP drives, CD-ROM, data tape drives, semiconductor memories, PCMCIA cards, etc.

The executable code and any associated data may be loaded from a network server into memory in the computer system. Other media that may bear the executable code include similar memory devices used in the computer system of such a network server operating as the download source as well as various transportable memory devices or scannable media enabling loading of the code into the network download server or directly into the computer system 51.

The software download from some type of network to the destination computer system may utilize a transportable medium, such as a CD-ROM or floppy disk. Alternatively, the server may send the programming through a network, such as the OSS network 147, to download the code and associated data to the destination computer system 51. Such a download signal typically will travel through portions of the packet switched network serving as the OSS network 147, but other types of network links may carry the signal. Hence, another class of machine-readable medium encompasses optical, electrical, and electro-magnetic signals or waves for carrying the code and associated data both on physical links and on wireless links.

Those skilled in the art will recognize that the inventive concepts disclosed above may be embodied in a variety of different practical implementations.

For example, initially, the predictive model was used to generate simulated loop data for two hundred loops. The simulated loop data may be used to train the expert system and/or run a simulation of system operation to test the concept of qualifying loops using the inventive methodology. Preferably, actual loop qualification systems will use data regarding actual loops. However, an implementation of the invention may still include the predictive model program as an extra resource for use by the expert system. For example, the prediction of performance based on the input value for the length of the new loop would be one more piece of data analyzed by the layers of the expert system to reach its own prediction result.

As another example, the above discussion focused on networks providing xDSL services over twisted pair wiring. The inventive loop qualification techniques may be adapted to qualify other types of physical links for one or more types of digital service.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system for qualifying a loop with regard to digital subscriber line service in a network providing a plurality of levels of digital subscriber line service over a plurality of loops, comprising:

a database of records regarding loops in service in a predefined section of the network, each record regarding a respective in-service loop comprising a predetermined characteristic data regarding the respective in-service loop and performance data with regard to capability of operation of a digital subscriber line service over the respective in-service loop;

an expert system coupled to the database to lam a plurality of statements correlating the predetermined characteristic data to the performance data; and a source, coupled to the expert system, for input of at least some predetermined characteristic data regarding a loop to be qualified within the predefined section of the network, wherein in response to the input regarding the loop to be qualified, the expert system applies the learned statement to the input characteristic data to develop a prediction of digital subscriber line service performance data for the loop to be qualified without testing said loop to be qualified for digital subscriber line performance.

2. A system as in claim 1, wherein the predefined section of the network corresponds to a service area of an office of the network providing services for the respective loops and for the loop to be qualified.

3. A system as in claim 1, wherein the predefined section of the network corresponds to a service area of a bank of equipment providing digital subscriber line services for the respective loops for the loop to be qualified.

4. A system as in claim 3, wherein the bank of equipment comprises a digital subscriber line access multiplexer.

5. A system as in claim 1, wherein, to the extent known, the predetermined characteristic data for the loops comprises parameters regarding: loop lengths, bridged tap lengths, and pre-bridged tap lengths.

6. A system as in claim 1, where in the predetermined characteristic data comprises any two or more cable make-up parameters selected from the group consisting essentially of: loop lengths, wire gauges, bridged taps, bridge tap lengths, post-bridged tap lengths, pre-bridged tap lengths, binder groups, and loop bundle characteristics.

7. A system as in claim 6, wherein the two or more cable make-up parameters characterized twisted pair wiring.

8. A system as in claim 1, wherein the expert system comprises a computer running a neural network program.

9. A system as in claim 1, wherein the neural network program implements a genetic algorithm to develop the statements correlating the predetermined characteristic data to the performance data corresponding to the levels of digital subscriber line service.

10. A system as in claim 1, wherein the prediction of digital subscriber line service performance data for the loop to be qualified classifies the loop into one of a plurality of service level categories corresponding to the levels of digital subscriber line service provided by the network.

11. A system as in claim 1, further comprising a monitoring system for monitoring equipment providing digital subscriber line service over one or more loops and supplying the performance data to the database.

12. A system as in claim 1, further comprising a predictive model for predicting a level of service in response to a specified item of characteristic data regarding the loop to be qualified and for supplying the predicted level of service as an additional input to the expert system.

13. A system as in claim 1, wherein the predetermined characteristic data relates to wire lines of a local exchange telephone network.

14. A method of qualifying a loop with regard to digital subscriber line service in a network providing a plurality of levels of digital subscriber line service over a plurality of loops, comprising:

training an expert system to qualify a loop in a predefined section of the network, the training comprising:
 (a) accessing a database of records regarding loops in service in the predefined section of the network, each record regarding a respective in-service loop comprising predetermined characteristic data regarding the respective in-service loop and performance data regarding capability of operation of a digital subscriber line service over the respective in-service loop; and
 (b) correlating the predetermined characteristic data to the performance data such that the expert system develops a plurality of statements regarding the relationships of the predetermined characteristic data to the performance data;

receiving at least some predetermined characteristic data regarding a loop to be qualified within the predetermined section of the network; and applying the statements to the input characteristic data to develop a prediction of digital subscriber line service performance data for the loop to be qualified without testing said loop to be qualified for digital subscriber line performance.

15. A method as in claim 14, further comprising:

provisioning the network to provide digital subscriber line service over the loop to be qualified at a service level corresponding to the predicted performance data;

monitoring operation of the provided digital subscriber line service over the loop to be qualified, to determine actual performance data; and updating the database by adding the actual performance data in association with the input characteristic data for the loop to be qualified.

16. A method as in claim 15, further comprising repeating the training of the expert system using the updated database and in response qualifying another loop.

17. A method as in claim 14, further comprising the step of compiling predetermined characteristic data regarding the in-service loops from a source of cable make-up data.

18. A method as in claim 17, wherein the cable make-up data relates to configuration of subscriber lines of a telephone network.

19. A method as in claim 18, wherein the source of cable make-up data comprises a legacy database of network information for loop plant facilities of a local exchange carrier.

20. A method as in claim 18, wherein the source of cable make-up data comprises a loop test system.

21. A method as in claim 18, further comprising the stop of monitoring digital communications on the in-service loops to compile performance data for the in-service loops.

22. A method as in claim 18, wherein the cable make-up data for each line comprises any two or more parameters, to the extent available, selected from the group consisting essentially of: loop length, wire gauge, bridge tap, bridge tap length, post-bridge tap length, pre-bridge tap length, binder group, and loop bundle characteristics.

23. A method as in claim 14, further comprising classifying the predicted performance data into one of a plurality of predefined ranges corresponding to the plurality of levels of digital subscriber line service provided by the network.

24. A software product comprising:

a machine readable medium; and expert system programming code for a compute system, carried by the machine readable medium, wherein execution of the expert system programming code by the computer system causes the computer system to qualify a loop with regard to digital subscriber line service in a network providing a plurality of levels of digital subscriber line service over a plurality of loops, the qualification comprising performance of the following steps:

training the expert system by:

(c) accessing a database of records regarding loops in service in the network, each record regarding a respective in-service loop comprising predetermined characteristic data regarding the respective in-service loop and performance data regarding capability of operation of a digital subscriber line service over the respective in-service loop; and (d) correlating the predetermined characteristic data to the performance data such that the expert system develops a plurality of statements regarding the relationships of the predetermine characteristic data to the performance data;

receiving at least some predetermined characteristic data regarding a loop to be qualified within the predefined section of the network; and applying the statements to the input characteristic data to develop a prediction of digital subscriber line service performance data for the loop to be qualified without testing said loop to be qualified for digital subscriber line performance.

25. A software product as in claim 24, wherein the expert system programming code comprises neural network software.

26. A software product as in claim 25, wherein the neural network software uses a genetic algorithm to correlate predetermined characteristic data to performance data.

27. A software product as in claim 25, wherein the expert system is adapted to process predetermined characteristic data comprising any two or more parameters selected from the group consisting essentially of: loop length, wire gauge, bridge tap, bridge tap length, post-bridge tap length, pre-bridge tap length, binder group, and loop bundle characteristics.

28. A software product, comprising:

at least one computer readable medium;

expert system programming code, carried by said at least one computer readable medium, for execution by a computer to qualify a loop with regard to digital subscriber line service in a network providing a plurality of levels of digital subscriber line service over a plurality of loops; and a database of records, carried by said at least one computer readable medium, for use during execution of the expert system programming code, each record comprising predetermined characteristic data regarding a respective in-service loop of the network that has been qualified with regard to digital subscriber line service and performance data regarding capability of operation of the digital subscriber line service over the respective in-service loop, wherein execution of the expert system programming code by a computer causes the computer to perform the following steps:

learn a plurality of predictive statements from correlation of the predetermined characteristic data regarding the in-service loops to the performance data regarding the in-service loops;

receive at least some predetermined characteristic data regarding another loop to be qualified; and apply the predictive statements to the received characteristic data to predict performance data for digital subscriber line service with regard to the other loop without testing said loop to be qualified for digital subscriber line performance.

29. A software product as in claim 28, wherein the execution of the expert system programming code further causes the computer to classify the other loop with respect to one of a plurality of available levels of service based on the predicted performance data.

30. A software product as in claim 28, wherein the expert system programming code comprises neural network software.

31. A software product as in claim 30, wherein the neural network software uses a genetic algorithm to correlate predetermined characteristic data to performance data.

* * * * *